US011989124B2

(12) United States Patent
Shilane et al.

(10) Patent No.: US 11,989,124 B2
(45) Date of Patent: May 21, 2024

(54) GARBAGE COLLECTION FOR A DEDUPLICATED CLOUD TIER WITH ENCRYPTED SEGMENTS

(71) Applicant: EMC IP Holding Company LLC, Hopkinton, MA (US)

(72) Inventors: Philip Shilane, Newtown, PA (US); Abhinav Duggal, Colma, CA (US); Ramprasad Chinthekindi, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 55 days.

(21) Appl. No.: 16/395,966

(22) Filed: Apr. 26, 2019

(65) Prior Publication Data

US 2020/0341891 A1 Oct. 29, 2020

(51) Int. Cl.
*G06F 12/02* (2006.01)
*G06F 3/06* (2006.01)

(52) U.S. Cl.
CPC ........ *G06F 12/0253* (2013.01); *G06F 3/0608* (2013.01); *G06F 3/0652* (2013.01); *G06F 3/067* (2013.01)

(58) Field of Classification Search
CPC .. G06F 12/0253; G06F 3/0608; G06F 3/0652; G06F 3/067; G06F 9/45558; G06F 2009/45562; G06F 2009/45595
USPC ................................................. 711/104, 154
See application file for complete search history.

(56) References Cited

U.S. PATENT DOCUMENTS

| 9,411,815 | B1* | 8/2016 | Lu ....................... G06F 11/1453 |
| 9,794,061 | B1 | 10/2017 | Bushman |
| 9,959,280 | B1 | 5/2018 | Whitehead et al. |
| 10,019,323 | B1 | 7/2018 | Bai et al. |
| 10,078,583 | B1* | 9/2018 | Wallace .............. G06F 11/1453 |
| 10,108,543 | B1 | 10/2018 | Duggal et al. |
| 10,235,285 | B1 | 3/2019 | Wallace |
| 2005/0256864 | A1 | 11/2005 | Semerdzhiev |
| 2011/0016095 | A1 | 1/2011 | Anglin et al. |
| 2013/0191626 | A1 | 7/2013 | Kuno et al. |
| 2014/0095798 | A1 | 4/2014 | Doshi et al. |

(Continued)

FOREIGN PATENT DOCUMENTS

| CN | 1509435 A | 6/2004 |
| CN | 102473127 A | 5/2012 |

(Continued)

OTHER PUBLICATIONS

PCT/US2019/068028, Apr. 20, 2020, International Search Report and Written Opinion.

(Continued)

*Primary Examiner* — Than Nguyen
(74) *Attorney, Agent, or Firm* — Workman Nydegger

(57) ABSTRACT

Systems and methods for performing data protection operations including garbage collection operations and copy forward operations. For deduplicated data stored in a cloud-based storage or in a cloud tier that stores containers containing dead and live segments, the dead segments are deleted by copying live segments into new containers and then deleting the old containers. The copy forward is based on a recipe from a data protection system and is performed using a microservices that can be run as needed in the cloud.

19 Claims, 10 Drawing Sheets

(56) References Cited

U.S. PATENT DOCUMENTS

| | | | |
|---|---|---|---|
| 2014/0188819 A1 | 7/2014 | Bagal et al. | |
| 2015/0356110 A1 | 12/2015 | Lin et al. | |
| 2017/0169233 A1* | 6/2017 | Hsu | G06F 21/602 |
| 2018/0196743 A1 | 7/2018 | McVay et al. | |
| 2019/0362081 A1 | 11/2019 | Kanno | |
| 2021/0096898 A1 | 4/2021 | Tsirkin | |
| 2021/0294502 A1 | 9/2021 | Wang et al. | |

FOREIGN PATENT DOCUMENTS

| | | |
|---|---|---|
| CN | 102541689 A | 7/2012 |
| CN | 103415842 A | 11/2013 |
| CN | 103944988 A | 7/2014 |
| CN | 105027122 A | 11/2015 |
| CN | 109347814 A | 2/2019 |
| EP | 3367292 | 8/2018 |

OTHER PUBLICATIONS

International Search Report and Written Opinion received for PCT Patent Application No. PCT/US2019/068013, dated Apr. 24, 2020.
International Search Report and Written Opinion received for PCT Patent Application No. PCT/US2020/023578, dated Jul. 6, 2020, 15 pages.
U.S. Patent Application filed on Apr. 26, 2019, by Duggal et al., Entitled "Garbage Collection for a Deduplicated Cloud Tier,", U.S. Appl. No. 16/395,984.
U.S. Patent Application Filed on Apr. 26, 2019, by Shilane et al., U.S. Appl. No. 16/395,966.
U.S. Appl. No. 16/395,984, filed Apr. 26, 2019, Duggal et al.
U.S. Appl. No. 16/402,288, filed May 3, 2019, Chinthekindi et al.

* cited by examiner

GC Cost metrics using copy forward GC

| MONTHLY GC COST | | STANDARD | STANDARD IA |
|---|---|---|---|
| Storage Cost | | -$2,126.25 | -$1,265.63 |
| | TRANSACTION COST | | |
| Number of Objects Read | | 3317760000 | |
| Cost of GETS from CT | | $ 1,327.10 | $ 3,317.76 |
| Data Retrieval Cost | | - | $ 2,025.00 |
| Data transfer cost (upto 10TB)/month | | $ 921.60 | $ 921.60 |
| Data transfer cost (next 40TB)/month | | $ 3,481.60 | $ 3,481.60 |
| Data transfer cost (next 150TB)/month | | $ 10,591.00 | $ 3,423.00 |
| Total Data Transfer Cost | | $ 14,994.20 | $ 7,826.20 |
| Number of Objects written | | 2654208 | |
| Cost of PUTS to CT | | $ 131.71 | $ 265.42 |
| Data Write Cost | | - | - |
| Total Transaction Cost | | $ 16,454.01 | $ 13,434.38 |
| TOTAL GC COST | | $ 14,327.76 | $ 12,168.76 |

GARBAGE COLLECTION FOR A DEDUPLICATED CLOUD TIER WITH ENCRYPTED SEGMENTS

FIELD OF THE INVENTION

Embodiments of the invention relate to systems, methods, and apparatus for protecting data. More particularly, embodiments of the invention relate to data protection operations including backup operations, restore operations, deduplication operations, and garbage collection operations. More specifically, embodiments relate to systems and methods for collecting garbage in a deduplicated cloud tier.

BACKGROUND

In many computing systems, data is often stored locally or on-site in an on-premise network. For many reasons, some entities desire to move at least some of their data to a target site such as a cloud-based storage system (the cloud). To reduce the storage costs associated with the cloud, it is useful to deduplicate the data before the data is written to the cloud. Entities that store their data in a deduplicated manner in the cloud may have the expectation that their cloud storage costs will decrease as data is deleted. This is not always true.

It turns out that deleting the objects can incur cost. This is due to deduplication. As new objects are written to the cloud, parts of data in previous object may be referenced by new files. When old objects are deleted, not everything in the objects becomes unreferenced. To delete the unreferenced portions, the objects need to be defragmented by reading the referenced parts of these objects and writing them into new objects. While writing to the cloud is inexpensive and often free, reading data from the cloud can be expensive. More specifically, in the context of conventional garbage collection operations, there is a need to transfer large amounts of data. Reading and transferring the data is expensive.

For example, transferring data from a cloud service provider may cost, for example, $0.09 per GB for the first 10 TB transferred. The cost of reading 1 TB per week is about $4,800 per year. Entities that are deleting many TBs of data may incur high network costs during garbage collection operations at least because of the need to transfer the data back to the local system in order to properly delete data that is stored in a deduplicated form.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 8 illustrates a cost analysis showing the benefit of a microservice based garbage collection operation.

DETAILED DESCRIPTION OF SOME EXAMPLE EMBODIMENTS

Embodiments of the present invention generally relate to data protection and to systems, methods, and apparatus for performing data protection operations. Examples of data protection operations include, but are not limited to, backup operations, restore operations, replication operations, disaster recovery operations, disaster recovery testing operations, failover or partial failover operations, data synchronization operations, replication operations or the like or combination thereof. More particularly, embodiments of the invention relate to systems, hardware, software, computer-readable media, and methods for performing data protection operations.

Embodiments of the invention relate to a data protection system (e.g., DELL EMC DATA DOMAIN) that includes or provides, by way of example, a local or active tier for data storage and a cloud tier for data storage. More particularly, embodiments of the invention relate to garbage collection operations that are performed on the active tier and/or the cloud tier. In deduplicated storage systems, the data (objects, files, etc.) are often chunked into chunks or segments. A garbage collection operation is performed to remove dead or unreferenced segments—the segments that no longer correspond to data that should still be stored in the storage system. Unreferenced or dead segments can be removed by the garbage collection operation while live segments should not be removed by the garbage collection operation. Removing dead segments can reduce storage requirements.

Data in the cloud tier is often stored in chunks or segments for deduplication purposes. As a result, and as objects are added/deleted from storage, some of the segments become unreferenced segments or dead segments while other segments remain as live segments. The data structures used to store the segments often include a mix of dead segments and live segments. To recover storage space and for other reasons, embodiments of the invention relate to systems and methods for removing dead segments from the data stored in the cloud tier while preserving the live segments. Embodiments of the invention contemplate performing garbage collection when the data stored in the cloud tier is encrypted and/or compressed.

Figure 1A:
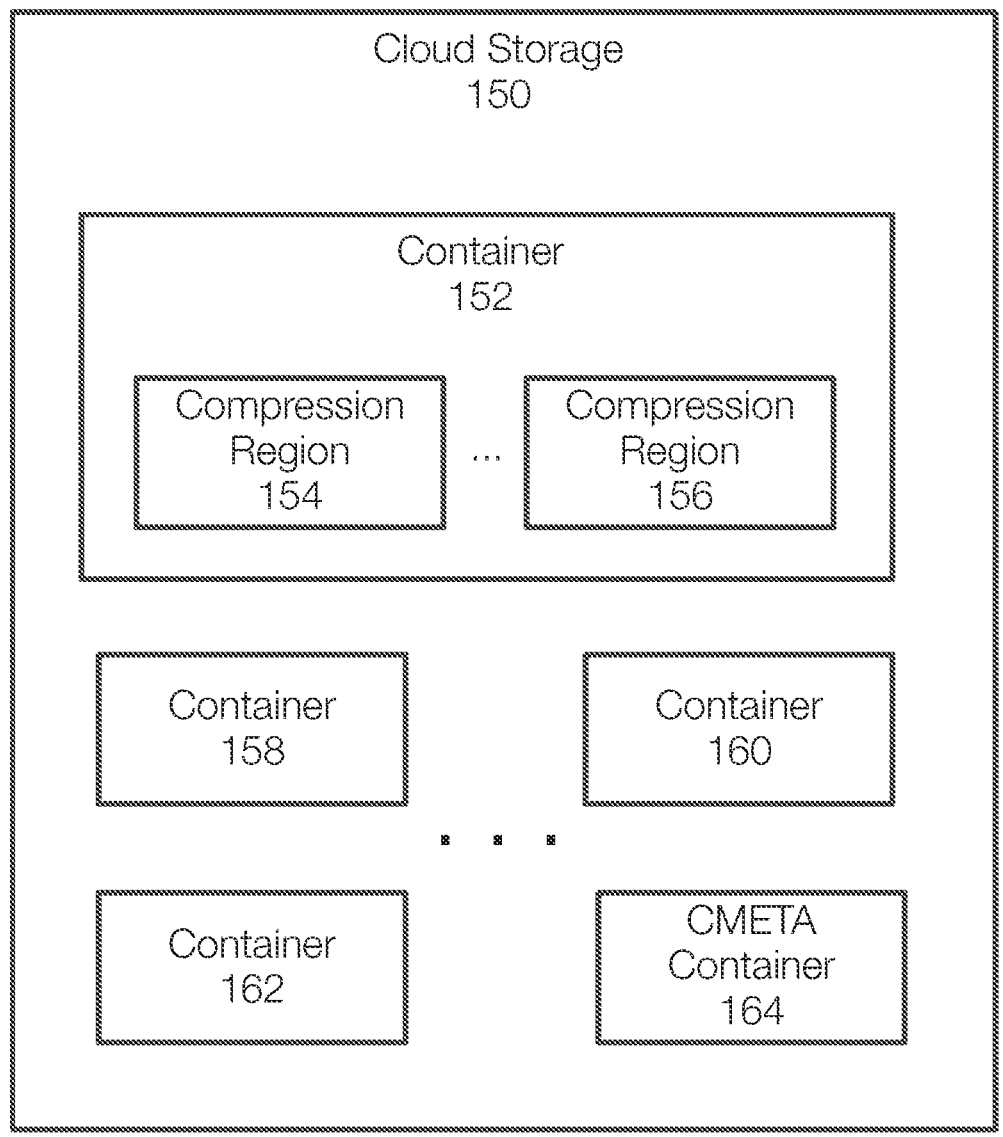
FIG. 1A illustrates an example of cloud storage where files or objects are stored in containers.
Figure 1B:
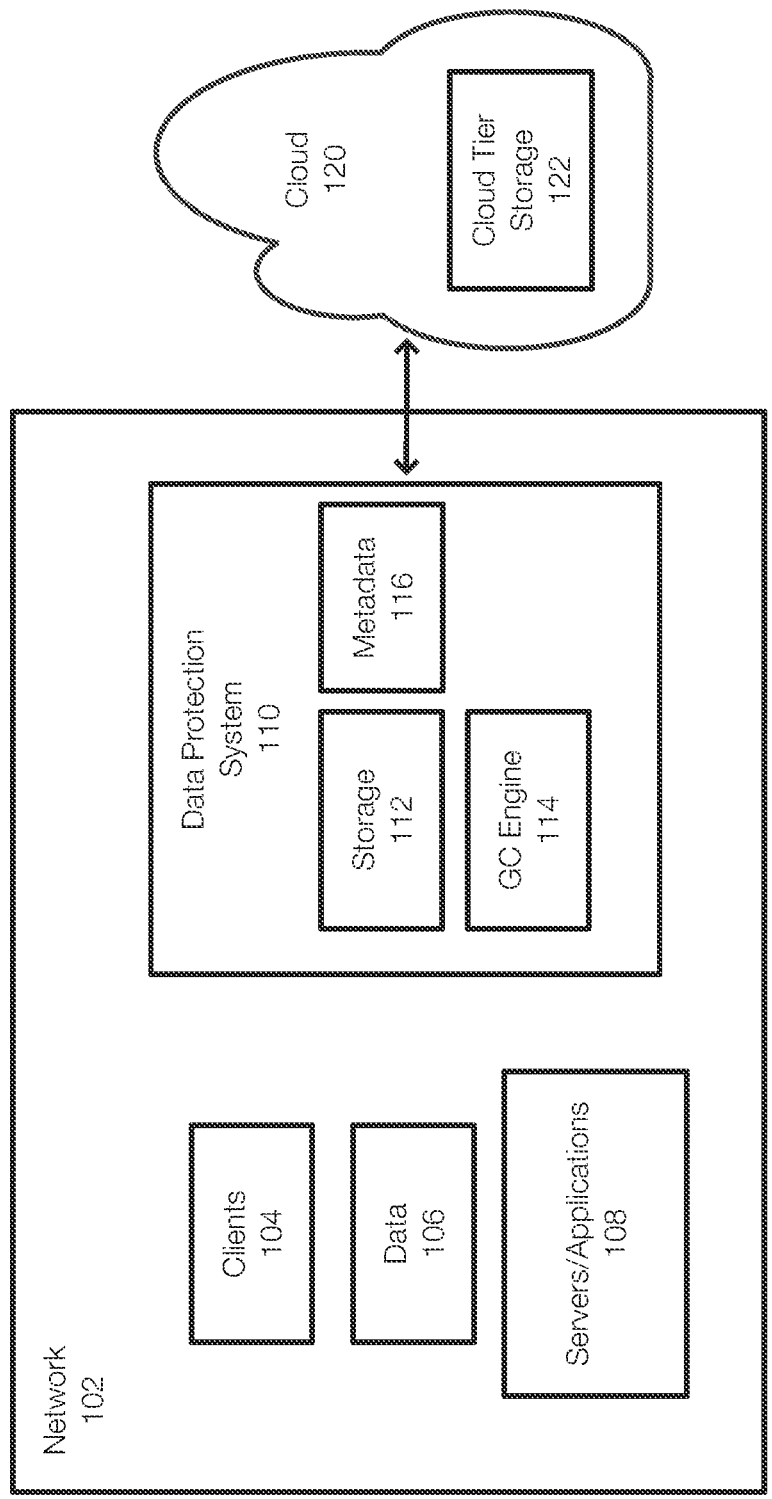
FIG. 1B illustrates an example of a data protection system that provides data protection operations including deduplication and garbage collection in an on-premise active tier and a cloud tier.

FIG. 1A illustrates an example of data stored in cloud storage. FIG. 1A illustrates a cloud storage 150. The data of a user may be stored in containers in the cloud storage 150. In this example, the cloud storage 150 includes containers, which are represented as containers 152, 158, 160, 162 and 164. The number of containers is not limited and the containers may be of different types. Some containers, such as the containers 152, 158, 160 and 162 may store segments in compression regions. Containers such as the container 164 (CMETA containers) may be metadata containers and may be configured to store metadata.

The container 152, for example, stores segments in compression regions. The compression regions of the container 152 are represented as compression regions 154 and 156. Each compression region stores segments of data. Thus, the compression regions 154 and 156 may each store some number of segments. Further, the segments or the compression regions 154 and 156 may be compressed and/or encrypted.

As described in more detail below, the compression region 154 (like other compression regions) may contain both live segments and dead segments. To clean the container 152, for example, the data protection system may first identify the live segments and/or the dead segments and the associated containers/compression regions. To clean a compression region, the compression region may be decompressed and/or decrypted. The decryption may require a key provided by the data protection system.

Once the compression regions being cleaned are decompressed and/or decrypted, the live segments are copied forward into a new container. The dead segments are not copied forward. Thus, the compression region in the new container only contains live segments, at least initially. The new compression region can then be compressed and/or encrypted. Once the compression regions of a container have been copied forward in this manner to a new container, the container may be deleted to release storage space in the cloud.

In one example, the deadness of the compression regions may be considered due in part to the computational cost of cleaning the container. If the ratio of dead segments to live segments in the container 152 is less than a threshold, the container may not be cleaned until the ratio is higher.

When a container is cleaned, the changes to the segments (e.g., new location, new container ID, new location in the new container, etc.) are reflected in the CMETA container 164 (which may be cleaned in a similar manner). There may be multiple CMETA containers. This ensures that the data protection system is aware of the locations and other metadata of the segments and is able to perform deduplication.

Thus, to free up storage space after data deletions, live segments in compression regions are copied from an old or existing container to a new container, and the old container is then deleted. In this manner, storage requirements can be reduced because the dead segments are effectively removed from the cloud storage 150.

Because the deduplication is managed by the on-premise appliance, embodiments of the invention reduce costs by reducing the reads and data transfer. Embodiments of the invention advance the functioning of the computing system and provide a cloud based microservice that can receive instructions from the on-site data protection system. The data protection system maintains metadata locally that allows the data to be deduplicated and that allows the live segments and/or the dead segments in the cloud tier (and the active tier) to be identified. This information allows instructions to be generated and sent to the cloud based microservice for execution. The instructions from the data protection system may include a recipe that describes which data to copy forward. For example, the instructions may include a bitmap for each of the compression regions identifying live segments and dead segments. These recipes can be applied to the containers being cleaned to copy forward the live segments from the existing containers to new containers. This eliminates network transfer significantly and dramatically lowers customer costs while supporting fine-grained cleaning of the data stored in the cloud tier.

An architecture for performing a garbage collection operation includes a garbage collection (GC) microservice that pairs with a garbage collection engine of the data protection system (e.g., DATA DOMAIN). In one example, the GC engine running locally may pair or work with one or more instances of a GC microservice running in the cloud that can interact with the data stored in the cloud. The GC engine coordinates with the GC microservice to perform garbage collection operations in the cloud tier or, more specifically, in the cloud tier object storage.

FIG. 18 illustrates an example of a system that includes or is associated with a data protection system 110 (e.g., DELL/EMC Data Domain). The data protection system 110 may be implemented, for example, as an appliance (physical or virtual) or using a server/agent configuration.

FIG. 18 illustrates a network 102, which represents an on-site computing system. The network 102 may be associated with servers/applications 108 (e.g., database, email, file servers, virtualization). The clients 104 are able to use and access the servers and applications 108 over the infrastructure of the network 102. The network 102 is also associated with data 106 that may be stored on storage devices. The data 106 may be stored on storage devices and backed up by the data protection system 110 using storage 112.

The data protection system 110 provides data protection services that may include, but are not limited to, backup operations, restore operations, deduplication operations, garbage collection operations, or the like. The data protection system may provide storage 112 (also referred to as active or local tier). Backups of the data 106 (and/or virtual machines, applications, objects (e.g., files) may be stored in the storage 112. Further, the storage 112 may be deduplicated by the data protection system. The data protection system 110 may also include a garbage collection (GC) engine 114 that is configured to remove unreferenced objects or segments from the storage 112.

The data protection system 110 may also provide or be associated with cloud storage (cloud 120). In one example, the cloud 120 may be used to provide tier storage 122 (also referred to as a cloud tier). The data protection system 110 can use the tier storage 122 to store some of the data that is stored on the storage 112. For example, a customer may select certain files or data from the storage 112 that can be be migrated to and stored in the cloud tier storage 122.

At the same time, the data protection system 110 may be responsible for deduplicating the data at both the storage 112 and the cloud tier storage 122. The data protection system 110 may also maintain metadata 116 that identifies live and/or dead segments in the storage 112 and/or in the storage 122 or that allows the live and/or dead segments to be identified.

The data protection system 110 is configured to minimize or reduce data transfer requirements, at least in the context of garbage collection, to the cloud while making decisions about the liveness of containers, compression regions, and/or segments stored in the compression regions and while deleting data from the cloud tier storage 122. Enough metadata 116 is stored locally in the data protection system 110 such that the GC engine 114 can determine the liveness of segments and make decisions about which segments to copy forward from an existing cloud container to new cloud containers in the cloud tier storage 122.

Figure 2:
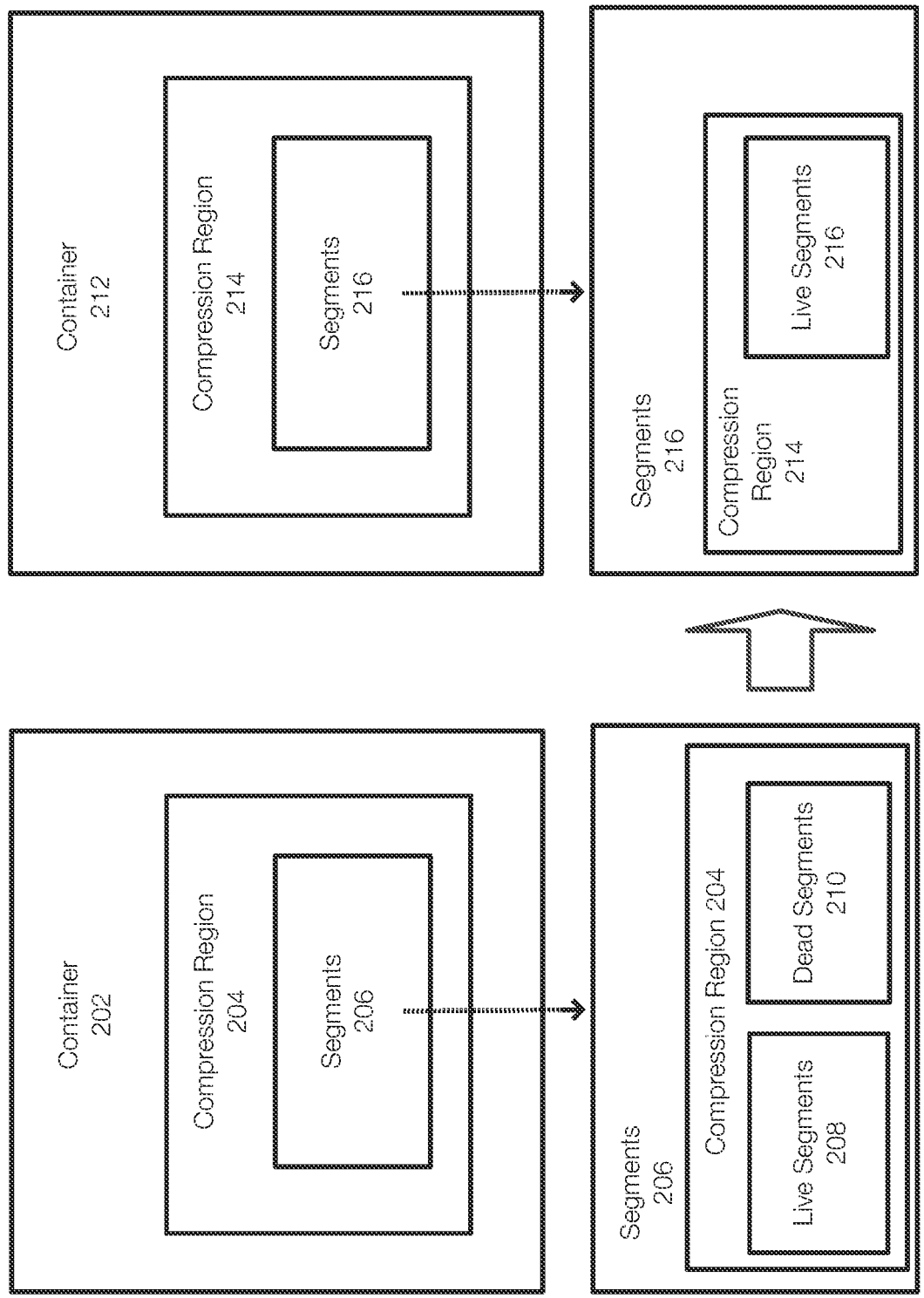
FIG. 2 illustrates an example of copying forward a container in the cloud tier.

FIG. 2 illustrates an example of containers stored in the cloud tier and illustrates an example of the copy forward process. FIG. 2 illustrates a container 202. The container 202 includes compression regions (represented by a compression region 204). The compression region 204, like the other compression regions of the container 202, includes segments 206.

At the beginning of a garbage collection operation, the segments 206 in the compression region 204 include live segments 208 and dead segments 210. If a compression region does not include any live segments, it is cleaned automatically because none of the segments will be copied forward. If a compression region does not include any dead segments, the entire compression region may be copied forward. In one example, when cleaning a container 202, all of the compression regions are cleaned such that the container can be deleted after the copy forward process.

During the garbage collection operation, a new container 212 is created. The new container 212, when written, will include compression regions (represented by a compression region 214). The compression region 214, like the other compression regions, will include segments 216 when written.

During a copy forward procedure when writing to the container 212, the live segments 208 from the existing or old container 202 are copied into the segments 216 of the compression region 214 Thus, the segments 216 differ from the segments 206 in that none of the dead segments 210 are copied into the segments 216 of the compression region 214. During the garbage collection operation, live segments from other compression regions of the container 202 or other containers may be copied into compression regions of the container 212.

The location of the segments 216 and other metadata regarding the segments 216, the compression region 214, and the container 212 is maintained by the data protection system either locally and/or in the cloud. In one example and after identifying the live segments 208 in the segments 206, the live segments 208 are copied forward by decompressing and/or decrypting the compression region, copying forward the live segments from the decompressed and decrypted compression region, and then compressing and/or encrypting the live segments 218 in the compression region 214. Alternatively, the compression region 214 may be compressed/encrypted as a whole.

Embodiments of the invention allow fine-grained copy-forward decisions without having to transfer data back to the source site for garbage collection purposes. During operation, the garbage collection operation will create one or more GC microservice instances in the cloud. These GC microservice instances have an advantage in that they can read cloud containers without the transfer cost of reading back to the on-premise data protection system 110. The GC microservice instances may start RPC (remote procedure call) servers and receive calls from the data protection system 110 with recipes specifying how to perform copy forward. In this example, the recipes may include a source container, an identification (e.g., a bitmap) of the live segments or the dead segments once the compression regions are decompressed and/or decrypted, and a destination container. After the garbage collection operation encrypts and/or compresses the new compression regions, the locations of the live segments are stored in metadata that may be maintained locally at the data protection system 110 and/or in the cloud. When the garbage collection operation completes, the GC microservice instances exit, so computational costs remain low.

A recipe from the data protection system may include a series of instructions (the instructions may include additional information such as the identification of which segments in the source containers are live/dead) such as:

Copy live segments from all compression regions in Container A, to compression regions in Container C.

Copy live segments from all compression regions in Container B to Container C.

Confirm Container C has Checksum value and write to object storage.

Delete Containers A and B.

As an integrity check, the checksum may be calculated over the fingerprints within the container when the data protection system does not have the segments themselves and only has their references. The fingerprints are stored in the metadata 116 associated with the containers in the cloud. As a result, metadata may also be stored in the cloud that relates to the segments stored in the cloud. When the new containers are written, the fingerprints may be confirmed or regenerated. Alternatively, the fingerprints can also be copied forward from the old container.

Figure 3:
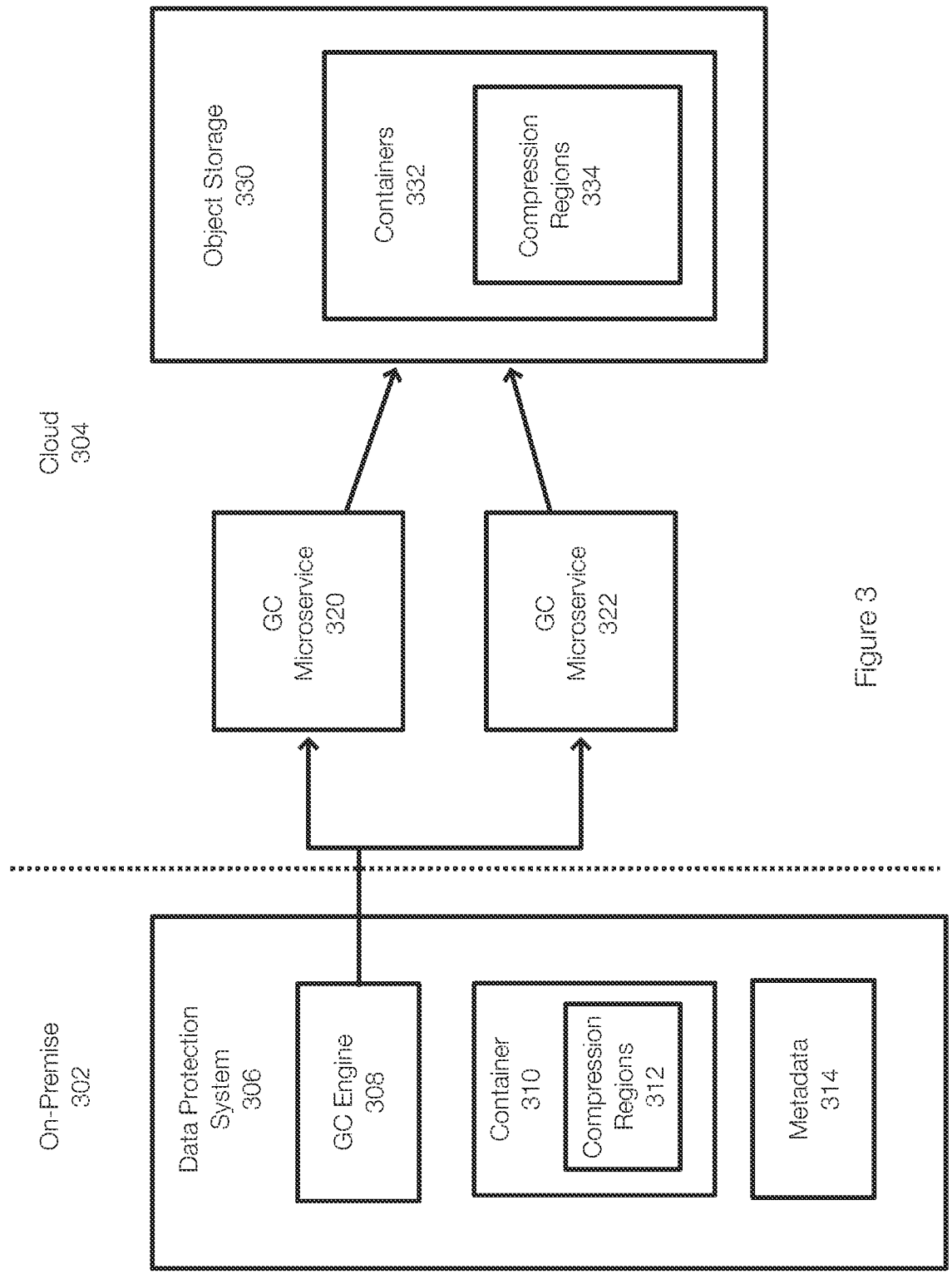
FIG. 3 illustrates an example of a cloud-based microservice configured to perform a data collection operation on a cloud-based object storage storing a cloud tier.

FIG. 3 illustrates systems and methods for performing a garbage collection operation in the context of a system 302 (e.g., an on-premise system) that is associated with an active tier and a cloud system 304 that is associated with a cloud tier. FIG. 3 illustrates a data protection system 306 that includes a GC engine 308 and that maintains containers 310 and segments 312 in the active tier. Some of the data has been migrated to the object storage 330 in the cloud 304 and stored in containers 332 and segments 334.

The metadata 314 may include container metadata (CMETA) stored in CMETA containers. The metadata 314 allows live segments and/or dead segments to be identified in the compression regions 334 of the containers 332.

During a garbage collection operation, the GC engine 308 may start or initiate one or more instances of a GC microservice (shown as GC microservices 320 and 322). The GC microservices 320 and 322 are configured to clean the containers 332. As illustrated, the data protection system 306 or the GC engine 308 is able to instantiate one or more instances of the GC microservice in the cloud. The GC microservices 320 and 322 can interact with the containers 332 in the cloud object storage 330 without incurring data transfer costs as previously described.

The garbage collection operation is scalable and may work on a batch of containers. For example, the containers can be processed in batches (also referred to as a range of containers). When processing the first batch, the GC engine 308 may allocate a portion of the batch to each of the GC microservices 320 and 322. Alternatively, a batch may be assigned to each of the GC microservices. This allows the batch to be cleaned in parallel. Batches can thus be processed in succession.

The GC microservices 320 and 322 may perform the copy forward, including the decompression, decryption, encryption, and compression aspects. The GC microservices 320 and 322 may be provided with the keys necessary to perform the encryption/decryption. In one example, the data protection may maintain a key server that allows the necessary keys to be managed. The keys may also be transmitted in an encrypted form.

Figure 4:
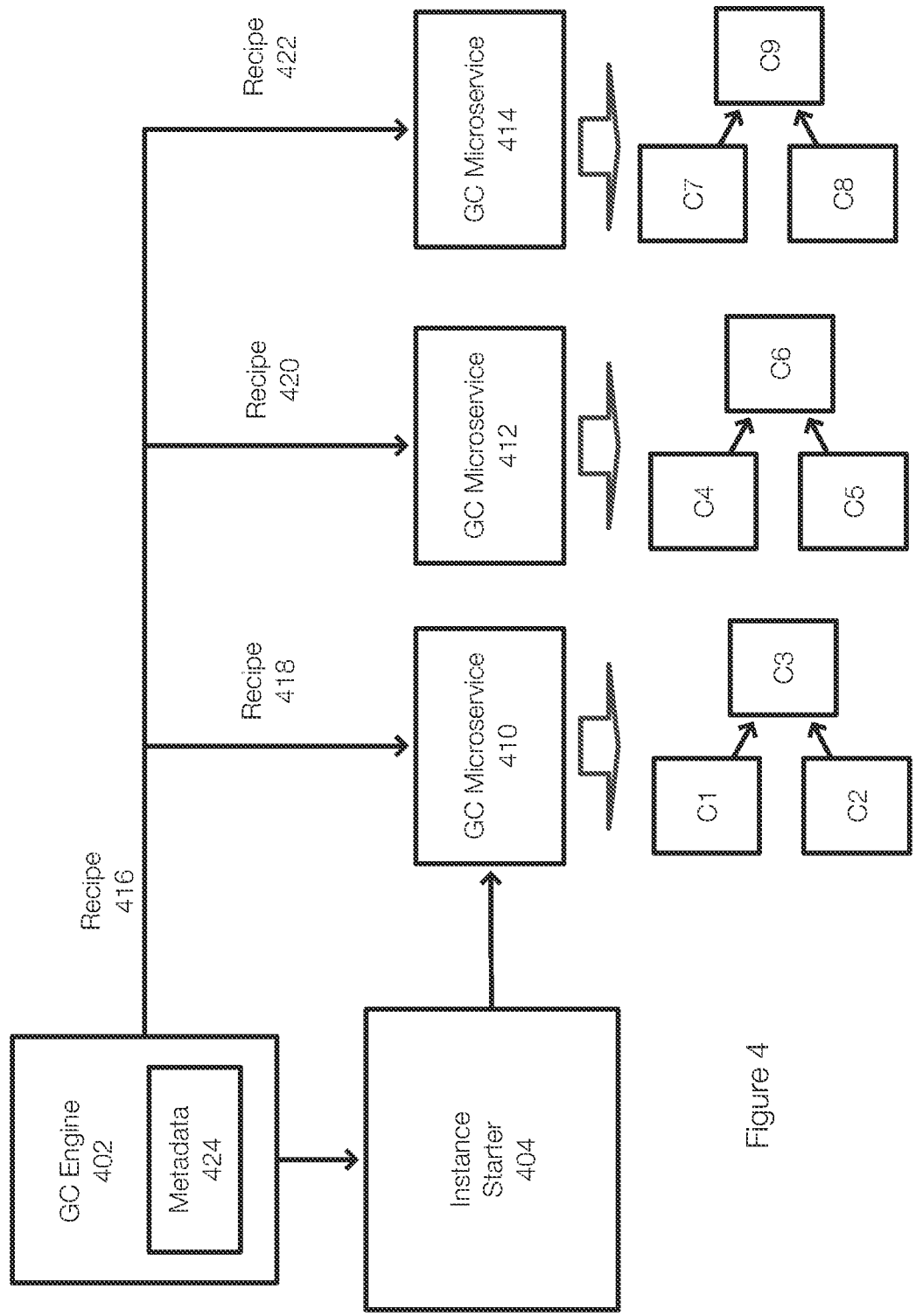
FIG. 4 illustrates an example of performing a microservice based garbage collection operation in a cloud tier.

FIG. 4 illustrates a microservice-based system for cleaning data stored in the cloud or in a cloud tier of a data protection system. FIG. 4 illustrates a garbage collection engine 402 that may be part of a data protection system. The garbage collection engine 402 is scalable and may be configured to control and manage multiple instances or multiple GC microservices.

When a garbage collection operation is initiated, the garbage collection engine 402 may start an instance starter 404, which may be part of the GC engine 402. The instance starter 404 is responsible for spinning up instances of the GC microservice (GC microservices 410, 412 and 414 in this example). The instance starter 404 may also be responsible for spinning down the instances of the GC microservices 410, 412 and 414 when the garbage collection operation ends. The instance starter 404 may also ensure that the GC microservices 410, 412, and 414 are up and running.

In this example, the GC engine 402 may control or manage the GC microservices 410, 412 and 414 that are actually performing the cleaning or the copy forwarding. In this example, the GC engine 402 can interface directly with the GC microservices 410, 412 and 414.

The GC engine 402 is configured to evaluate the metadata 424 and identify the data to be removed from the cloud tier. More specifically, the metadata is used to identify the live segments and the dead segments stored in the containers in the cloud tier. In one example, the metadata 424 may include a set of fingerprints that are live across the whole system. This master set may be generated, for example, as new files are chunked. This master set may also be adjusted as files are deleted. The fingerprints associated with segments in the cloud can be compared to this set to identify which segments are live/dead. This metadata 424 thus allows the GC engine 402 to generate a recipe or an instruction that can be sent to the GC microservices 410, 412, and 414. Thus, the GC engine 402 may send a recipe 416 to the to the GC microservices 410, 412, and 414. More specifically, the GC engine 402 may distribute the recipe to the GC microservices 410, 412, and 414 such that each instance or microservice operates on different containers. Thus, the GC microservice 410 may receive the recipe 418, the GC microservice 412 may receive the recipe 420, and the GC microservice 414 may receive the recipe 422. The GC engine 402 may only send portions of the recipe 416 to each of the GC microservices 410, 412 and 414. This allows the GC engine 402 to perform load balancing and allows the containers to be cleaned in batches and in parallel. The GC microservice 410, upon receiving the recipe 418, performs the instructions included in the recipe 418. In this example, this includes copying live segments from old or existing cloud containers C1 and C2 into a new cloud container C3 and then deleting the cloud containers C1 and C2. The GC engine 402 may ensure that the GC microservice 410 has copied all live segments and may ensure that there is no corruption or errors. Similarly, the GC microservice 412 performs the recipe 420 and copies live segments from the containers C4 and C5 into a new container C6 and then deletes containers C4 and C5. Similarly, the GC microservice 414 executes the recipe 422 and copies live segments from the containers C7 and C8 into the new container C9 and then deletes the containers C7 and C8.

More specifically in one example, the GC microservice 410 may receive the recipe 418 from the GC engine 402. As previously stated, the recipe 418 may be a part of the recipe 416 or may correspond to the portion of the recipe 416 to be performed by the GC microservice 410. Thus, the GC microservice 410 reads the recipe 418. The recipe is then performed by the GC microservice 410. Similarly, the GC microservices 412 and 414 perform, respectively, the recipes 420 and 422. In one example, the identifiers (IDs) of the new containers may also be specified in the recipe 418. This is an example of metadata that allows the data protection system to know the location of the segments after the copy forward process or after the garbage collection operation.

The recipe 418 may further identify the live segments in the compression regions of the various containers associated with the recipe 418. When performing the recipe 418, the compression regions of the containers affected by the garbage collection operation are decompressed and decrypted. Once this is completed, the live segments can be identified and copied forward to the new container.

Typically, all compression regions are processed for each of the containers that are affected by the garbage collection operation. By way of example, the live segments from a first compression region are copied into a first compression region in the new container. Similarly, live segments from a second compression in the same container may be copied to a second compression region in the new container. Live segments from other containers may be copied into corresponding compression regions. Once the copy forward process is complete, the new compression regions are compressed and/or encrypted.

A container may have, by way of example only, two parts: a metadata section and data sections or compression regions. In the data section, each compression region includes a bunch of compressed and/or encrypted segments. For each segment, a fingerprint may be calculated for deduplication purposes. The fingerprints may also be encrypted and/or compressed. The metadata section represents or stores the meta information of the container and may include various fields such as, but not limited to: how many compression regions are in the container, compressed and uncompressed sized of the compression regions, number of segments in each compression regions, total number of segments in the container, and a table of the fingerprints of all of the segments stored in the container.

Figure 5:
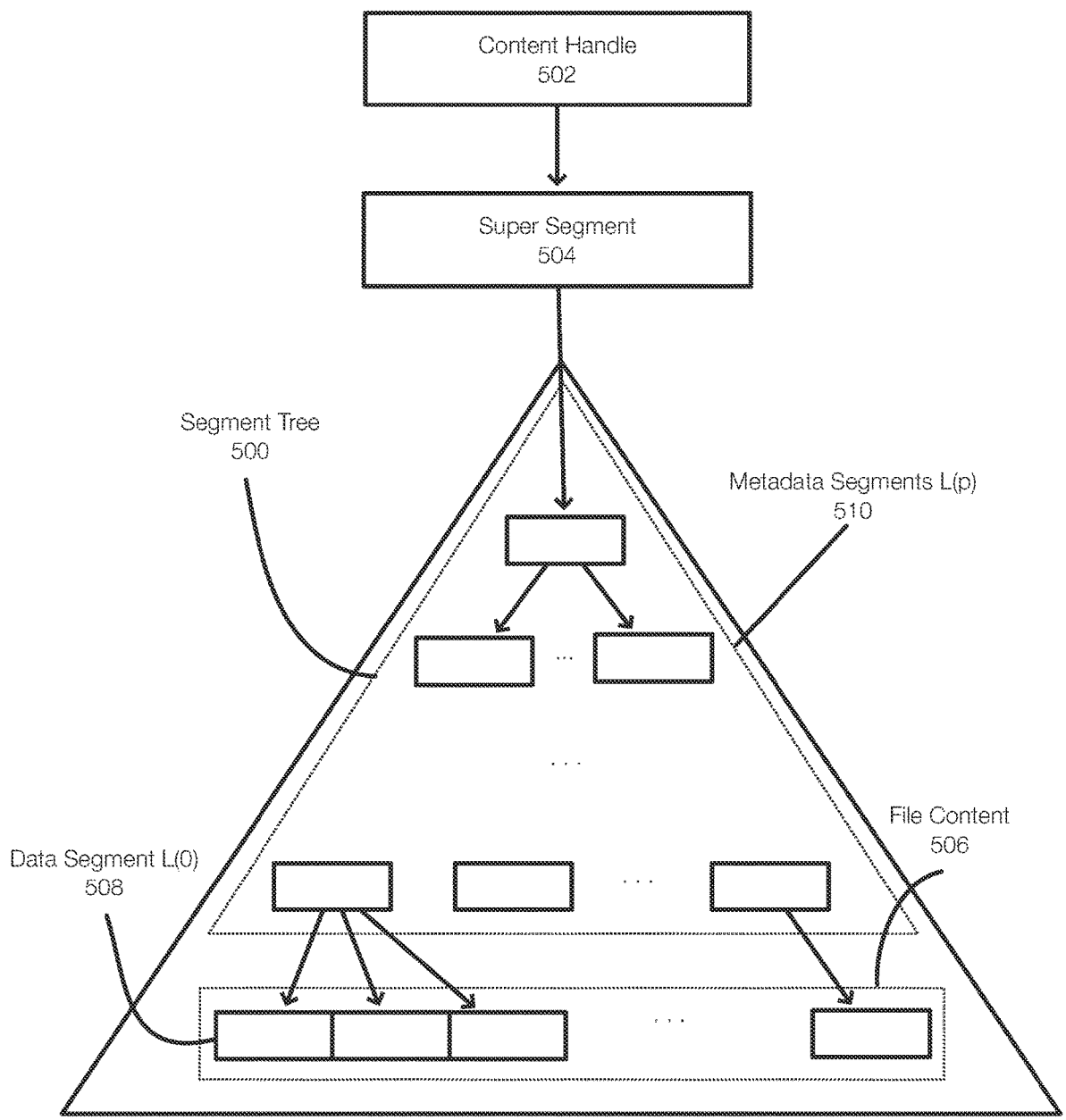
FIG. 5 illustrates an example of an object or file and how the object may be stored in a container.

FIG. 5 illustrates an example of how a file or an object may be represented in the active tier or in the cloud tier. As previously stated, objects or files may be stored in containers. A storage system may represent objects or files as a segment tree as illustrated in FIG. 5. A content handle 502 may point to a super segment 504 (which may be an example of a L6 segment). The metadata segments 510 may include Lp segments (e.g., L1 to L5 or L6 segments). Data segments L0 508 are the actual data of the file or object and may be stored in the leaf nodes of the segment tree 500. The metadata segments 510 and the data segments 508 are usually stored in separate containers. Thus, containers that store Lp segments may be referred to as Lp containers and containers that store L0 segments may be referred to as L0 containers.

A CMETA container is a container that stores metadata. More specifically, a CMETA container may store a collection of metadata sections of L0 and Lp containers. During garbage collection, the metadata (CMETA and Lp) may be used to identify the live segments and the dead segments. In order to avoid reading the metadata from the cloud, the metadata (e.g., CMETA containers and Lp containers) is stored locally and is replicated to the cloud. L0 containers are only written to the cloud in one embodiment. In one embodiment, the data is thus deduplicated with respect to both the active tier and the cloud tier. In one example, CMETA containers and Lp containers are maintained locally and in the cloud.

During garbage collection, the GC engine (e.g., the GC engine 308) may read the local CMETA containers. By reading the local CMETA containers, metadata of actual L0 containers and Lp containers in the cloud can be obtained.

This metadata may include fingerprints of all segments of the actual L0 and Lp containers.

Using this metadata, the GC engine 308 may look up fingerprints to determine the live and dead segments of the Lp containers. The data protection system may store fingerprints of all live segments managed by the data protection system such that the live and dead segments can be identified.

After the live segments are identified, the recipe or instruction can be sent such that the live segments are copied into new Lp containers. The new Lp containers are written locally and written to the cloud. Next, the metadata section of the new Lp containers are copied into a new CMETA container and the new CMETA container is written locally and as an object to the cloud.

Next, the metadata sections of the local CMETA containers are read to identify the live segments of source L0 containers or, more specifically, the live segments in each of the compression regions. This may be an iterative process using the metadata. This allows a recipe of live segments to be generated. For example, a bitmap of each compression region or another representation may be used to identify the live segments or the dead segments. These recipes are passed to the GC microservice so that the live segments can be copied forward into new containers or objects in the cloud once the compression regions are decompressed and/or decrypted.

Next, the metadata corresponding to the recipe compression regions is copied forward into a new CMETA container locally and replicated to the cloud. Finally, the old or the source Lp, L0 and CMETA containers (the containers from which segments were copied forward to new containers) can be deleted to reclaim cloud space.

In deduplicated storage systems, as previously discussed, the containers may store different types of data. Some containers may store data segments (e.g., L0 containers) while other containers may store data used in storing and reconstructing objects (e.g., Lp containers). These containers can be similarly processed during garbage collection.

In one example, the GC engine 402 is aware of the containers that store the data in the cloud tier. More specifically, the GC engine 402 stores or has access to metadata 424 describing the containers C1, C2, C4, C5, C7 and C8.

The recipe, in one example, may include a list of source containers to copy live segments from, a live/dead segment bitmap for each compression region or for each container, destination container list, destination CMETA container list. Thus, the recipe identifies the containers that are to be cleaned, a live dead segment bitmap (or other representation) that identifies which segments are live or dead in the compression regions of the containers being cleaned, the destination container list and the destination CMETA. This recipe is sent to the GC client 408 and then to one of the GC microservices or directly to the GC microservices. Once this process is complete in the cloud tier, the CMETA containers are written locally. The CM ETA containers correspond to the cloud tier CMETA containers and may contain metadata related to what is stored in the cloud tier. The CMETA containers thus enable deduplication. The Lp containers are also written locally.

When this process is completed and verified, the GC client 408 may report back to the GC engine 402 that the garbage collection has been performed successfully or report any error that may have occurred.

Figure 9:
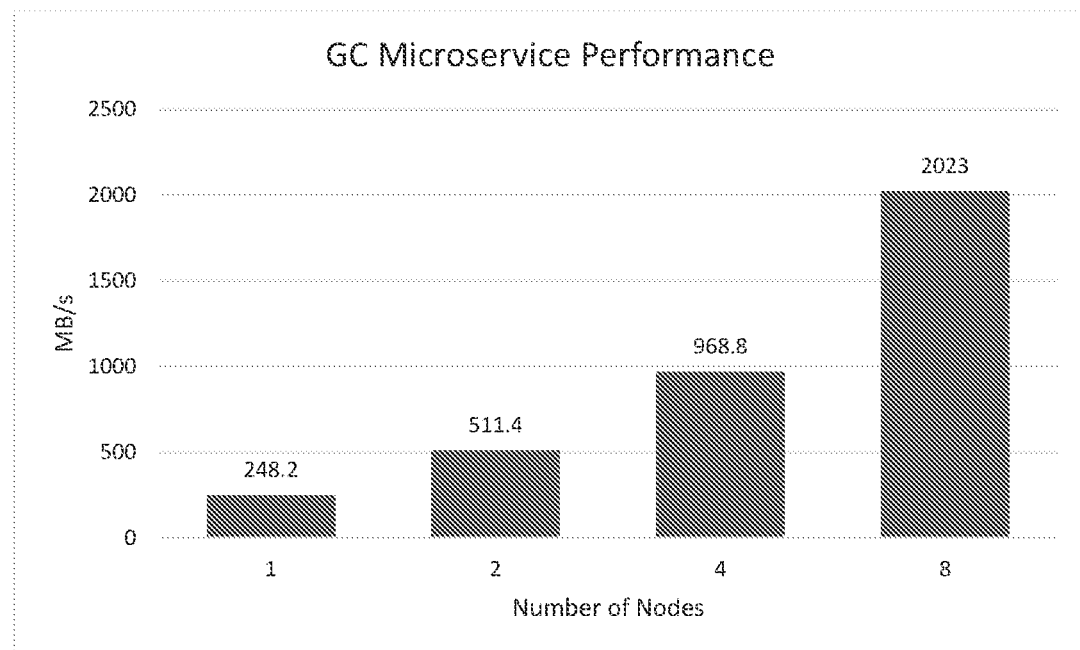
FIG. 9 illustrates an example of the GC performance as the number of instances increases from 1 to 8.

The following discussion illustrates examples of experiments in the cloud and presents a cost analysis. FIG. 9 illustrates an example of the GC performance as the number of instances increases from 1 to 8. The vertical axis is the throughput (MB/s) of copying forward segments into new compression regions and writing out containers. Performance is close to linear scaling.

In a cost analysis, it is assumed by way of example only, that the data protection system may write 4 MB sized objects. Conventionally, these objects do not die quickly (meaning that live segments may be present for a long time, they are not expected to quickly die due to fragmentation caused by deduplication). Thus, even if one segment in the 4 MB object is referenced by any file, the object cannot be deleted. The conventional solution is to perform ingress/egress cost in a situation where the object is transferred to the source site, cleaned, and then written back to the cloud.

By running microservices in the cloud, the ingress/egress cost is avoided. There is, however, a compute cost of running these microservices. As a result, the cost of microservices approach can be compared with the cost of transferring these objects over the network (ingress/egress cost).

Figure 6:
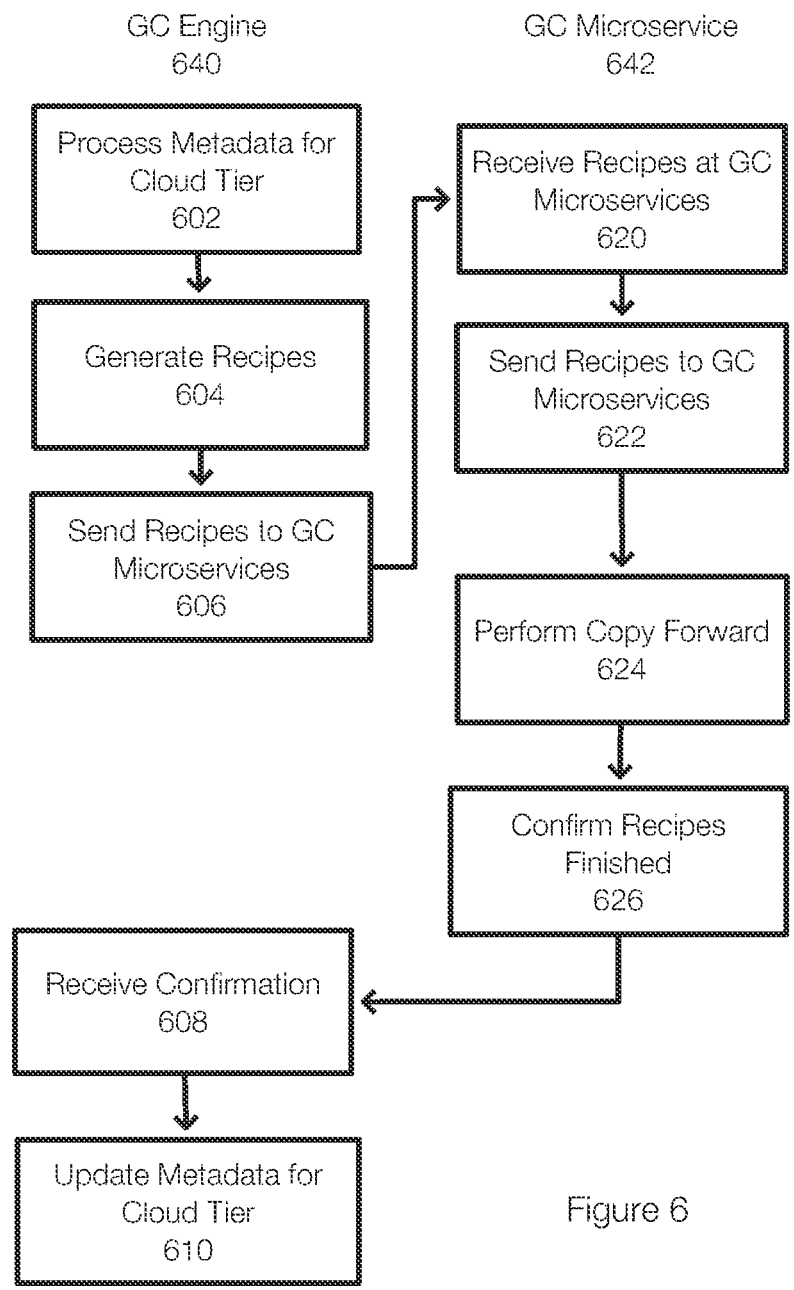
FIG. 6 illustrates an example of a method for performing garbage collection in a cloud tier.

FIG. 6 illustrates an example of a method for performing a data protection operation such as garbage collection on a cloud tier. FIG. 6 illustrates a method performed by the data protection system as a whole and illustrates aspects of a garbage collection operation that may be performed by various components. For example, the GC engine 640 may be located on-premise and may be configured to control data protection operations including garbage collection operations for the active tier and the cloud tier. The on-premise system may also be a cloud environment that allows cloud to cloud implementations.

The GC engine 640 may communicate with a GC microservice 642 that is instantiated in the cloud. The GC microservice 642 may be configured to manage the garbage collection operation in the cloud by directing or performing recipes received from the GC engine 640 and ensuring that the recipes are performed. The GC microservice 642, which may be implemented as a server, may perform part of the garbage collection operation including copy forward.

The method shown in FIG. 6 may begin by processing 602 metadata for the cloud tier. The on-premise system typically stores metadata describing the containers stored in the cloud and processing the metadata may include evaluating the metadata for containers stored in the cloud tier to identify the liveness and deadness of the data stored in the containers. The metadata may allow the GC engine 640 to identify which segments are dead segments and which segments, in each container (and in each compression region) are live segments. Because the GC engine is aware of the locations of the segments and is aware of or can determine the segments' status (live/dead) or can derive this information from the locally stored metadata, recipes can be generated 604 after the metadata is processed. The GC engine is also aware of how the data is compressed and/or encrypted. This allows the GC engine to provide any necessary keys to the GC microservice 642.

The recipe generated by the GC engine 640 typically identifies a source container, a representation of the live/dead segments such as a bitmap, and a destination container. More specifically, the recipe may include a container list, live/dead segment bitmap, destination container list, CMETA list. This information allows the GC microservice to copy the live segments to new containers without copying the dead segments.

Once generated, the recipes are sent 606 to GC microservices 642 that have been instantiated in the cloud. The GC microservices thus receive the recipes 620 and perform the copy forward based on the received recipes. As previously stated, the recipes can be divided up amongst multiple GC microservice instances. In one implementation, the GC microservice interfacing the data protection system may send 622 the recipes to GC microservices that actually clean the containers. Alternatively, the GC engine may simply send the recipe to the GC microservice 642 or the GC microservice instances and the GC microservice instances perform 624 the copy forward to clean the containers.

The copy forward can be performed 624, for example, by uncompressing and/or decrypting compression regions in the containers being cleaned, and copying the live segments identified from the recipe to new containers. As the live segments are written to their new destination, they may be compressed and/or encrypted.

This may be performed for both Lp containers and L0 containers. The CMETA for the new containers may be stored in a CMETA container.

The GC microservice 642 may confirm that the recipes have been executed or fully performed 626. The GC engine 640 then receives 608 confirmation that the recipe has been executed. This may include receiving metadata associated with the new containers. The metadata for the cloud tier is updated 610 by the GC engine 640.

Figure 7:
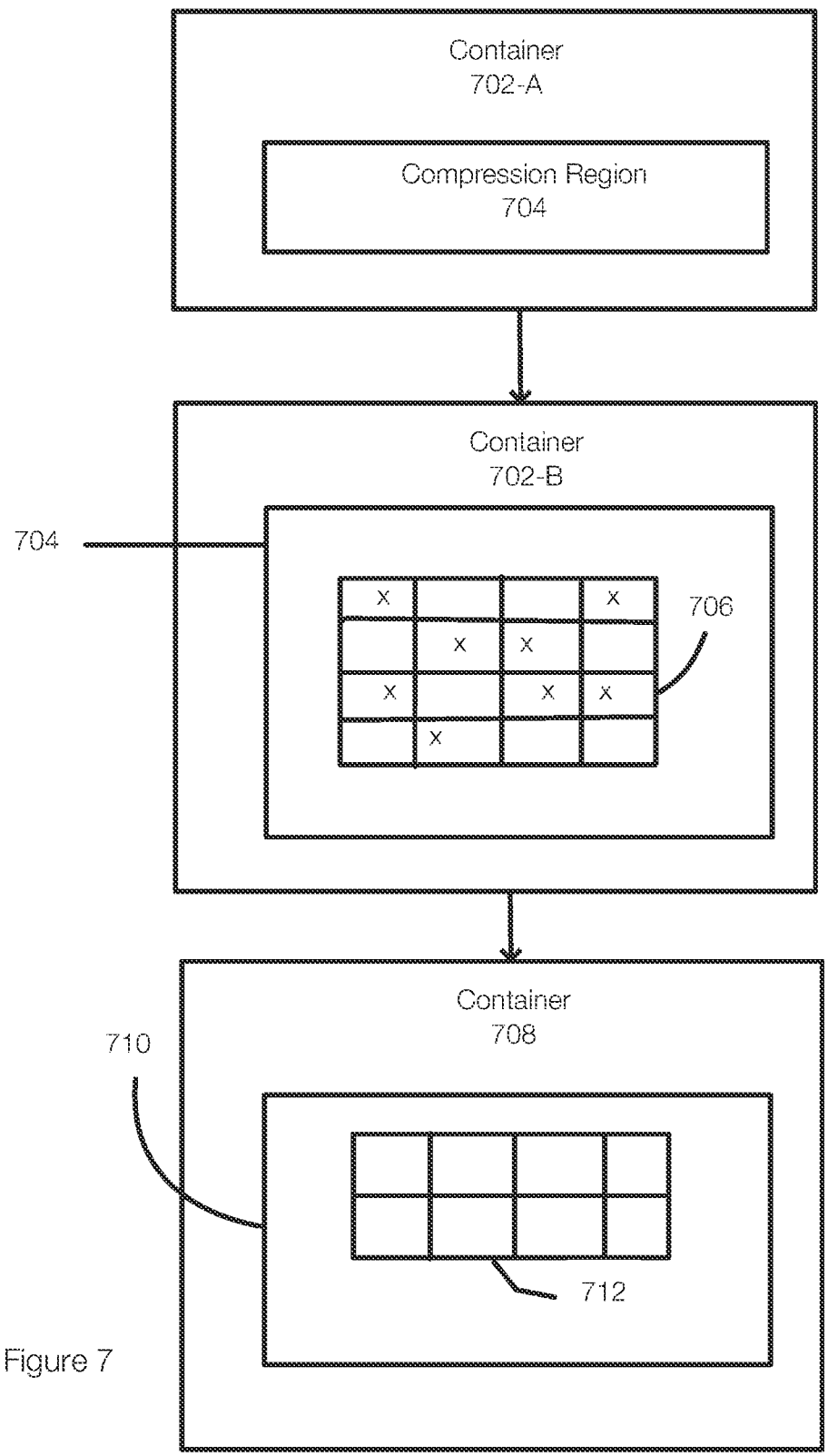
FIG. 7 illustrates an example of garbage collection including copy forward of segments in the cloud.

FIG. 7 illustrates the copy forward process in more detail. FIG. 7 illustrates an existing or old container 702-A. The container 702-A includes a representative compression region 704. Initially, the compression region 704 is compressed and/or encrypted. As part of the recipe, the data protection system or GC engine may provide a key or set of keys that allows the compression region to be decrypted. The compression region may also be decompressed. The order of compression/decryption may depend on the order in which the compression region was compressed/encrypted. The key may be transmitted to the cloud in encrypted form and can be decrypted by the GC microservice performing the garbage collection operation. Using the key (or the set of keys), the compression region is decrypted and/or decompressed as illustrated in the container 702-B, which is the container 702-A after decompression/decryption. A bitmap provided in the recipe or instruction from the data protection service allows dead segments (marked with x) to be identified in the decompressed and/or decrypted segments 706 in the compression region 704.

Next, the live segments (unmarked in this example) are copied forward into a compression region 710 of the new container 708 as segments 712. The compression region 710 may then be encrypted and/or compressed. The encryption may use the same key that was used previously or a new key or set of keys may be used. The locations and other metadata of the segments 712 and the container 708 may be stored in the CMETA and stored locally. This allows the data protection system to know the locations of live segments for deduplication purposes and subsequent garbage collection operations.

After the container 708 has been written, the container 702 may be deleted. As shown in FIG. 7, the storage space occupied by the segments 712 is smaller than the storage space occupied by the segments 706. As a result, the garbage collection operation has reduced the storage requirements of the computing system.

FIG. 8 illustrates the cost of running GC once a month on a cloud provider. This cloud provider has two storage configurations—Standard and Standard Infrequent Access. The cost for other cloud providers is similar.

A 1 PB cloud tier is assumed in this example. From experience, it is determined that there can be a 10% churn per GC cycle. Thus, out of 1 PB, 100 TB of data is expected to be dead. Due the fragmentation, the live and dead data will be distributed in a container (i.e. a container will have both live and dead data). The average liveness of a container that is cleaned is 50% (i.e. 50% of segments are dead and 50% are live). Based on these assumptions, to clean 100 TB of dead data with 50% average liveness, GC needs to read 200 TB of data from the cloud and write 100 TB of new data to the cloud. If each object size is 4 MB, GC needs to read 200 TB/4 MB=52428800 objects and write 52428800/2=26214400 objects to the cloud. The transaction cost of PUT operations is $0.005 per 1,000 requests and the cost of get is $0.0004 per 1000 requests. Thus, the transaction cost to read 52428800 objects is $262 and $10 for writing. But the major cost is the data transfer cost—ingress/egress cost. The data transfer cost for 200 TB of read and 100 TB of write is $14,994 Standard storage and $7826 for infrequent access.

In one example, the cost saved due to data cleaned is $2126.25 as the monthly data storage cost on the cloud is reduced.

If egress/ingress cost is avoided by running a microservice which performs the copy operation inside the cloud, $14994 per month can be saved.

Next, the compute cost associated with a microservice configuration is examined. In one example, this configuration may have 16 cores, 64 GB of memory and costs $0.8 per hour. In addition, the speed of such an instance can also be varied. In one example, at least 200 MB/s copy speed can be achieved. If 8 instances are spun up, a speed of 1.6 GB/s can be achieved. In this example and at this speed, it will require about 12800 seconds or about 35 hours to copy forward 200 TB of data. This results in a cost of $227.

Embodiments of the invention thus achieve a reduction in cost per GC cycle on the order of 66×. Further, it is much faster as many instances as desired can be started or the number can be controlled based on the data to be copied. In comparison, to copy forward over a network is significantly more costly and slower. Assuming that the network has 100 MB bandwidth, 100 MB/s read cannot be achieved in the best-case scenario. Thus, embodiments of the invention conserves network bandwidth for data movement to the cloud rather than wasting network bandwidth on conventional garbage collection methods.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar and Data Domain platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that provides an active tier of data and a cloud tier of data, a method for performing a garbage collection operation in the cloud tier, the method comprising:
   processing metadata stored in the active tier for the cloud tier by a garbage collection engine at an on-premise system associated with the active tier to identify containers in the cloud tier to be cleaned, wherein the identified containers contain compression regions, wherein at least some of the compression regions include both dead segments and live segments that are encrypted;
   generating recipes from the metadata stored at the active tier that identify locations of the live segments and of the dead segments in the compression regions in the identified containers stored in the cloud tier;
   initiating, by the garbage collection engine, a microservice in a cloud;
   sending the recipes from the garbage collection engine operating at the on-premise system to the microservice operating in a cloud;
   performing the recipes by the microservice, wherein the microservice exits after the garbage collection operation ends, wherein the microservice:
      decrypts the compression regions in the identified containers including the compression regions that include both dead segments and live segments, and copies only the live segments to compression regions in new containers from the identified containers;
      encrypts the live segments in the compression regions in the new containers; and
      deletes the identified containers after the recipes have been performed to free storage space used by the identified containers;
   copying metadata corresponding to the recipes into a new metadata container at the active tier and replicating the new metadata container to the cloud tier.

2. The method of claim 1, wherein the recipes identify at least a container, a location of the live segments or of the dead segments in the compression regions included in the container, and a destination container for storing the live segments.

3. The method of claim 1, further comprising decompressing the compression regions prior to copying forward the live segments and compressing the live segments in the compression regions of the new containers.

4. The method of claim 1, further comprising updating the metadata stored in the active tier to reflect the cloud tier after performing the recipes.

5. The method of claim 1, further comprising transmitting at least one key to the microservice, wherein the at least one key is used to decrypt the compression regions prior to copying forward the live segments and to encrypt the live segments in the new compression regions after copying forward the live segments.

6. The method of claim 5, further comprising identifying metadata of L0 and Lp containers included in the metadata for the cloud tier, the metadata of the L0 and Lp containers including fingerprints of segments in the L0 and Lp containers.

7. The method of claim 6, further comprising performing a lookup to identify live segments and dead segments of the Lp containers.

8. The method of claim 7, further comprising generating the recipes that allow the live segments from the Lp containers to be copied into new LP containers.

9. The method of claim 8, further comprising writing the new Lp containers locally and to the cloud.

10. The method of claim 9, further comprising copying metadata of the new Lp containers to a new CMETA container, wherein the new CMETA container is written locally and to the cloud.

11. The method of claim 1, further comprising iterating metadata sections of local CMETA containers to identify live segments of L0 containers.

12. The method of claim 11, further comprising forming the recipes based on the local CMETA containers.

13. The method of claim 12, further comprising copying metadata corresponding to the recipes into a new CMETA container locally and replicating the new CMETA container to the cloud.

14. A non-transitory computer readable medium comprising computer executable instructions that, when executed perform a garbage collection operation in a cloud tier of data associated with a computing system that also has a local tier of data, the method comprising:
   processing metadata stored in the active tier for the cloud tier by a garbage collection engine at an on-premise system associated with the active tier to identify containers in the cloud tier to be cleaned, wherein the identified containers contain compression regions, wherein at least some of the compression regions include both dead segments and live segments that are encrypted;
   generating recipes from the metadata stored at the active tier that identify locations of the live segments and of the dead segments in the compression regions in the identified containers stored in the cloud tier;
   initiating a microservice in a cloud;
   sending the recipes from the garbage collection engine operating at the on-premise system to the microservice operating in a cloud;
   performing the recipes by the microservice, wherein the microservice is spun down after the garbage collection operation ends, wherein the microservice:
      decrypts the compression regions in the identified containers including the compression regions that include both dead segments and live segments, and copies only the live segments to compression regions in new containers from the identified containers;
      encrypts the live segments in the compression regions in the new containers; and
      deletes the identified containers after the recipes have been performed to free storage space used by the identified containers; and
   copying metadata corresponding to the recipes into a new metadata container at the active tier and replicating the new metadata container to the cloud tier.

15. The non-transitory computer readable medium of claim 14, wherein the recipes identify at least a container, a location of the live segments and the dead segments in the compression regions included in the container, and a destination container for storing the live segments.

16. The non-transitory computer readable medium of claim 14, further comprising decompressing the compression regions prior to copying forward the live segments and compressing the live segments in the compression regions of the new containers.

17. The non-transitory computer readable medium of claim 14, further comprising transmitting at least one key to the microservice, wherein the at least one key is used to decrypt the compression regions prior to copying forward the live segments and to encrypt the live segments in the new compression regions after copying forward the live segments.

18. The non-transitory computer readable medium of claim 17, further comprising:
- identifying metadata of L0 and Lp containers included in the metadata for the cloud tier, the metadata of the L0 and Lp containers including fingerprints of segments in the L0 and Lp containers;
- performing a lookup to identify live segments and dead segments of the Lp containers;
- generating the recipes that allow only the live segments from the Lp containers to be copied into new LP containers;
- writing the new Lp containers locally and to the cloud; and
- copying metadata of the new Lp containers to a new CMETA container, wherein the new CMETA container is written locally and to the cloud.

19. The method of claim 1, further comprising:
- iterating metadata sections of local CMETA containers to identify live segments of L0 containers;
- forming the recipes based on the local CMETA containers; and
- copying metadata corresponding to the recipes into a new CMETA container locally and replicating the new CMETA container to the cloud.

* * * * *